US 6,698,135 B1

(12) United States Patent
Robbins (10) Patent No.: US 6,698,135 B1
(45) Date of Patent: Mar. 2, 2004

(54) PLANT ENCLOSURE WITH HOOD

(76) Inventor: L C Robbins, 30691 Bartels Rd., Bulverde, TX (US) 78163

( * ) Notice: Subject to any disclaimer, the term of this patent is extended or adjusted under 35 U.S.C. 154(b) by 42 days.

(21) Appl. No.: 10/107,767

(22) Filed: Mar. 27, 2002

Related U.S. Application Data

(63) Continuation-in-part of application No. 10/047,363, filed on Jan. 14, 2002.

(51) Int. Cl.[7] .............................................. A01G 13/04
(52) U.S. Cl. .............................. 47/29.7; 47/23.3; 47/30
(58) Field of Search .................... 47/29.7, 30, 31.1, 47/29.1, 29.2, 29.3, 29.4, 29.5, 72, 41.01; 206/423

(56) References Cited

U.S. PATENT DOCUMENTS

| | | | | | |
|---|---|---|---|---|---|
| 2,247,191 | A | * | 6/1941 | Enders | 47/41.01 |
| 3,699,198 | A | * | 10/1972 | Robinson | 264/255 |
| 4,903,431 | A | * | 2/1990 | Stoll | 229/110 |
| 5,222,325 | A | * | 6/1993 | Angus | 135/100 |
| 5,815,905 | A | * | 10/1998 | Weder | 29/469.5 |
| 5,836,105 | A | * | 11/1998 | Loosen | 248/154 |
| 5,966,866 | A | * | 10/1999 | Ferguson | 206/423 |
| 5,970,653 | A | * | 10/1999 | Liang et al. | 47/30 |
| 6,088,952 | A | * | 7/2000 | Wilson | 47/30 |
| 6,230,436 | B1 | * | 5/2001 | Givens | 47/29.5 |
| 2001/0049903 | A1 | * | 12/2001 | Gilbert | 47/41.01 |

* cited by examiner

Primary Examiner—Peter M. Poon
Assistant Examiner—Jeffrey L. Gellner
(74) Attorney, Agent, or Firm—Wayne J. Colton, Inc.

(57) ABSTRACT

A plant enclosure for protecting outdoor plants from cool weather conditions generally comprises a sheet of thermally insulating material scored to form a plurality of panels. Each panel is substantially identically shaped such that the sheet may be expanded and formed into an approximately conical shape from a folded shape, the folded shape being substantially identical to the shape of each panel. A plurality of fasteners are attached to the panels and adapted to maintain the sheet in either the approximately conical shape or the folded shape. The plant enclosure is also provided with a hood portion affixed about an orifice through the upper portion of the panel structure for enclosing the upper foliage of a protected plant.

19 Claims, 8 Drawing Sheets

PLANT ENCLOSURE WITH HOOD

RELATED APPLICATION

This application is a continuation-in-part under 35 U.S.C. § 120 of Applicant's U.S. patent application Ser. No. 10/047,363 filed Jan. 14, 2002. By this reference, the full disclosure of U.S. patent application Ser. No. 10/047,363 is incorporated herein as though now set forth in its entirety.

FIELD OF THE INVENTION

The present invention relates to the care and maintenance of outdoor plants. More particularly, the invention relates to a hood for use in combination with a plant enclosure adapted to prevent loss of outdoor plants due to cool weather conditions.

BACKGROUND OF THE INVENTION

Although many people enjoy growing plants, few enjoy the labor involved when a sudden drop in temperature requires their plants to be moved indoors or to be covered. What is more, many plants in large containers are simply too heavy to be readily moved, thus requiring them to either be covered or to be lost to inclement weather. Unfortunately, it is often difficult to completely enclose an outdoor plant and is almost always extremely time consuming to do so adequately. Additionally, even though the plant enthusiast may at first think that he or she has adequately enclosed such a plant, many enthusiasts labor many hours to this end only to discover that wind conditions accompanying inclement weather have completely dismantled the ad hoc wrappings. As a result, Applicant has in a previous related U.S. patent application described a plant enclosure that may be quickly and easily assembled over nearly any size outdoor plant. The described plant enclosure is also economical to manufacture yet reliable in use, even in high winds or extremely low temperatures. Finally, the described plant enclosure is also readily adapted for use with hanging plants as well as plants in pots on the ground or actually growing in the ground.

Applicant has discovered, however, that although the previously described plant enclosure is adequate for the protection of many types of plants, some types of plants are difficult to completely enclose notwithstanding Applicant's previously described contributions to the art. In particular, plants having relatively voluminous foliage at or near their tops are especially difficult to completely enclose. Unfortunately, many of such plant types, like the palm for example, are among the more expensive of plants. It is therefore an object of the present invention to improve upon Applicant's previously described plant enclosure by providing an embodiment that is readily adapted for the enclosure of plants having relatively voluminous upper structures. Additionally, it is an object of the present invention to provide such an embodiment that meets each object met by Applicant's previously described plant enclosure.

SUMMARY OF THE INVENTION

In accordance with the foregoing objects, the present invention—a plant enclosure for protecting outdoor plants from cool weather conditions—generally comprises a sheet of thermally insulating material scored to form a plurality of panels. Each panel is substantially identically shaped such that the sheet may be expanded and formed into an approximately conical shape from a folded shape, the folded shape being substantially identical to the shape of each panel. A plurality of fasteners are attached to the panels and adapted to maintain the sheet in either the approximately conical shape or the folded shape. The plant enclosure also comprises a hood portion affixed about an orifice through the upper portion of the panel structure, the hood portion being adapted for quickly and easily enclosing the upper foliage of an enclosed plant. Finally, the plant enclosure may also be provided with additional features such as, for example, wind stabilizers to prevent toppling in high winds or heating elements to provide extra protection in even very cold weather conditions.

Finally, many other features, objects and advantages of the present invention will be apparent to those of ordinary skill in the relevant arts, especially in light of the foregoing discussions and the following drawings, exemplary detailed description and appended claims.

BRIEF DESCRIPTION OF THE DRAWINGS

Although the scope of the present invention is much broader than any particular embodiment, a detailed description of the preferred embodiment follows together with illustrative figures, wherein like reference numerals refer to like components, and wherein.

DETAILED DESCRIPTION OF THE PREFERRED EMBODIMENT

Although those of ordinary skill in the art will readily recognize many alternative embodiments, especially in light of the illustrations provided herein, this detailed description is exemplary of the preferred embodiment of the present invention, the scope of which is limited only by the claims appended hereto.

Figure 1:
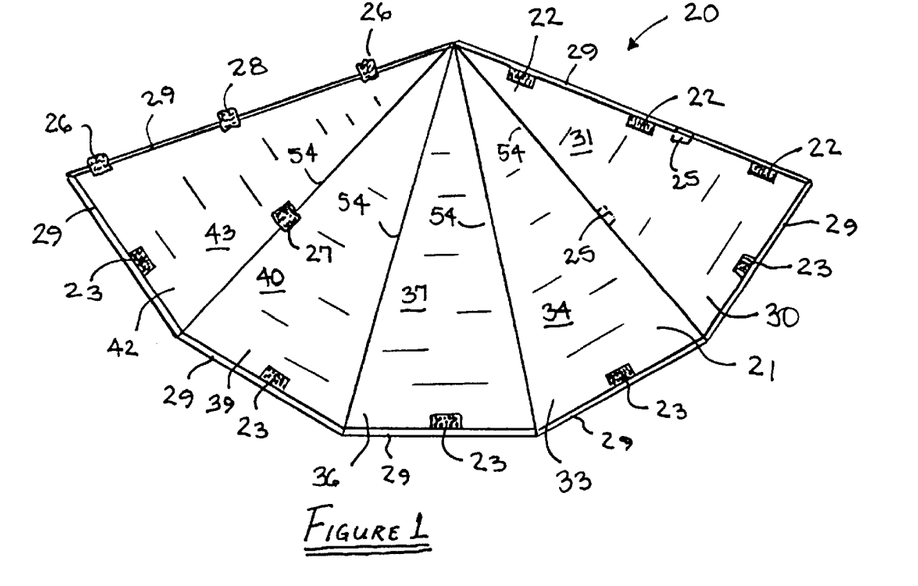
FIG. 1 shows, in an outer side plan view, one embodiment of a plant enclosure as laid out flat.
Figure 2:
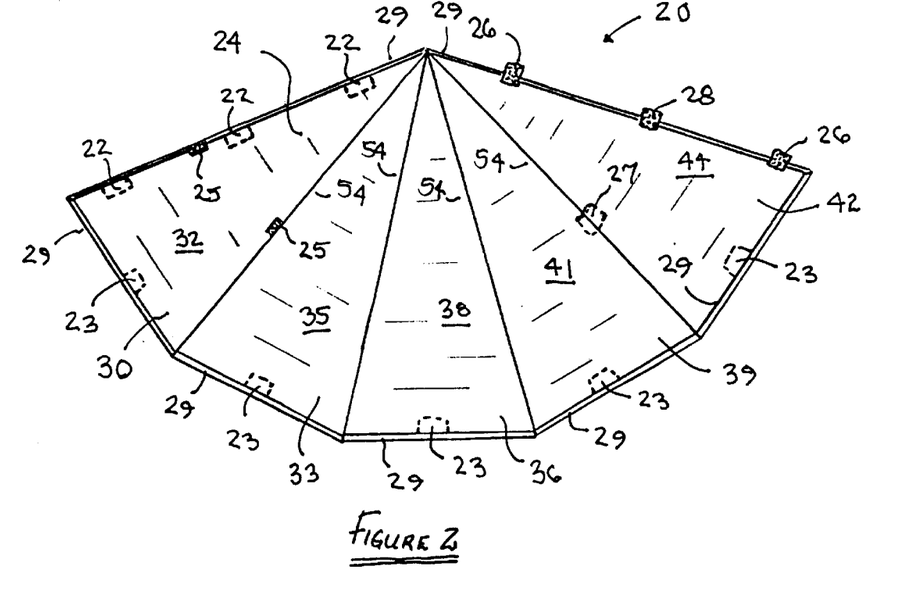
FIG. 2 shows, in an inner side plan view, the plant enclosure of FIG. 1 as laid out flat.

Referring now to the figures, the plant enclosure 20 appropriate for use as part of the present invention is shown to generally comprise a sheet of material having insulating properties and being scored along a plurality of score lines 54 such that the sheet forms a plurality of panels 30, 33, 36, 39, 42. Although those of ordinary skill in the art will recognize many substantially equivalent alternatives, Applicant has found suitable for purposes of the present invention such materials as fluted cardboard laminates or fluted polyurethane laminates such as are readily available under the trademark "COROPLAST" from Coroplast of Dallas, Tex. While each material exhibits similar thermal characteristics, it should be noted that the latter is also moisture resistant while the former should be treated with a spray-on polyurethane or the like for implementation of the present invention in the moisture-rich environments to be expected during inclement weather. In any case, as shown particularly in FIGS. 1 and 2, the outer side 21 and the inner side 24 of the plant enclosure 20 are provided with various tabs 22, 23, 25, 26, 27, 28 for facilitating both set up and storage of the plant enclosure 20, as will be better understood further herein. As also will be better understood further herein, those of ordinary skill in the art will recognize that each tab 22, 23, 25, 26, 27, 28 may be economically implemented with releasably engageable hook and loop type materials as are commonly available under the wellknown trademark "VELCRO." Finally, the plant enclosure 20 is preferably provided with a plurality of channel-shaped plastic or metal edge reinforcements 29 along any edge expected to be exposed to repeated impact or any significant quantity of moisture.

Figure 3:
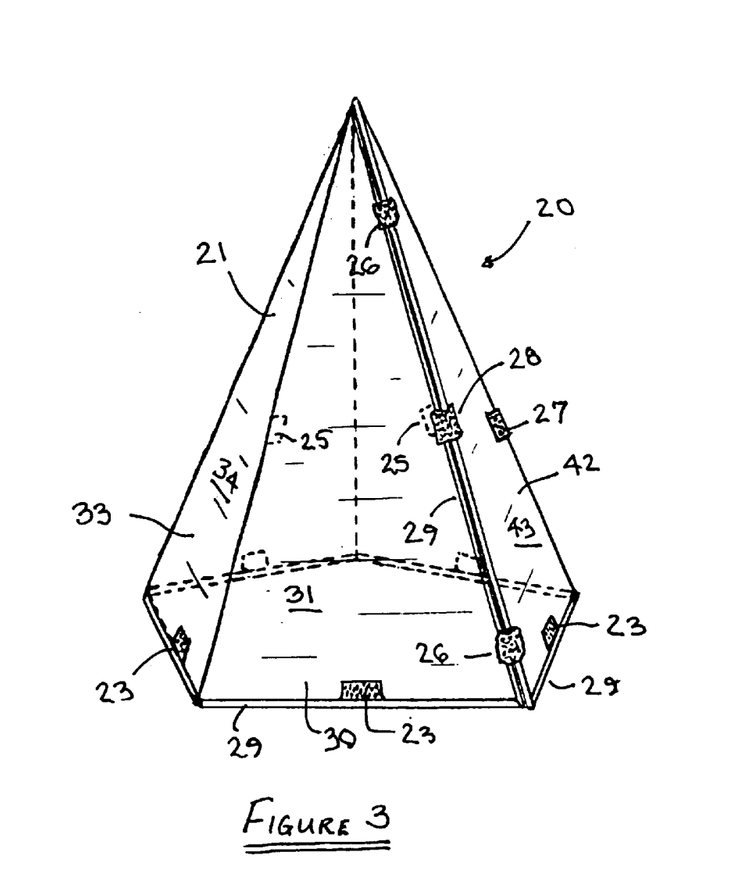
FIG. 3 shows, in a perspective view, the plant enclosure of FIG. 1 as assembled for use about a plant.

As particularly shown in FIG. 3, the score lines 54 enable the plant enclosure 20 to be easily assembled into a semi-closed structure having an approximately conical shape for the covering of a plant. Although the plant enclosure 20 is shown to form a structure with a pentagonal base, those of ordinary skill in the art will recognize the virtually unlimited number of shapes that the plant enclosure 20 may take. Applicant has found, however, that the five-panel structure depicted strikes a good balance between the desire to maximize the enclosed space with as little material as necessary and the desire to present a product that is both easily set up and easily folded for storage.

Figure 4:
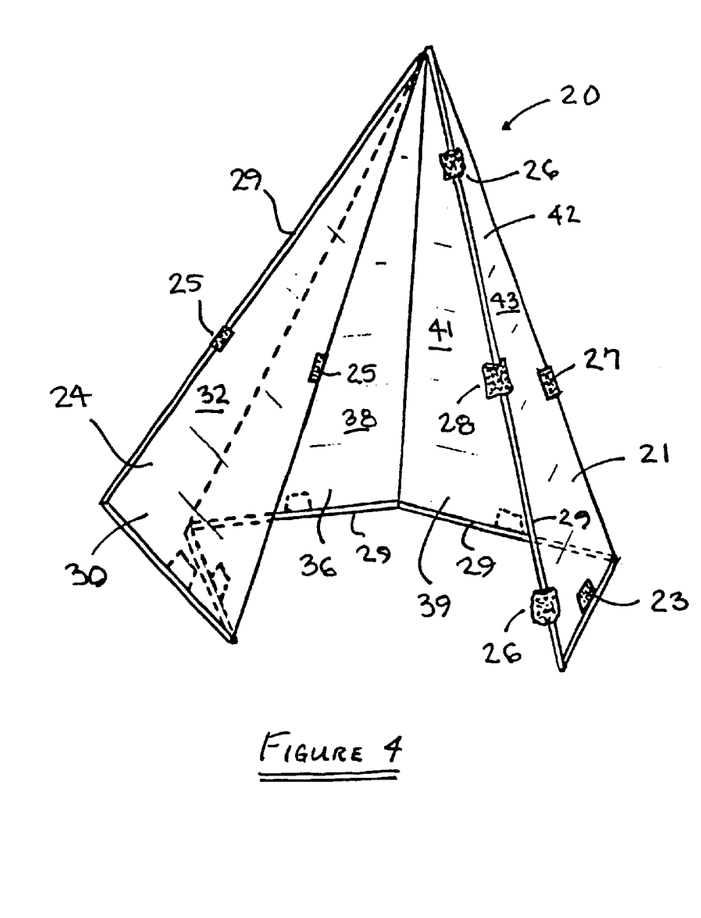
FIGS. 4 through 6 show, in perspective views, details of the folding for storage of the plant enclosure of FIG. 1.
Figure 5:
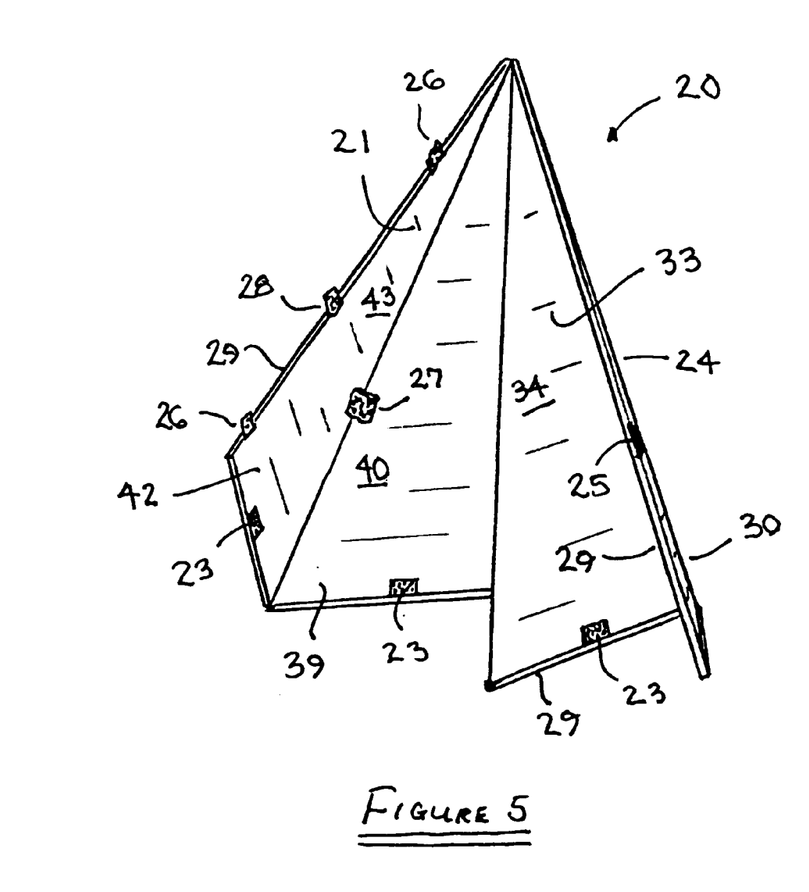
Figure 6:
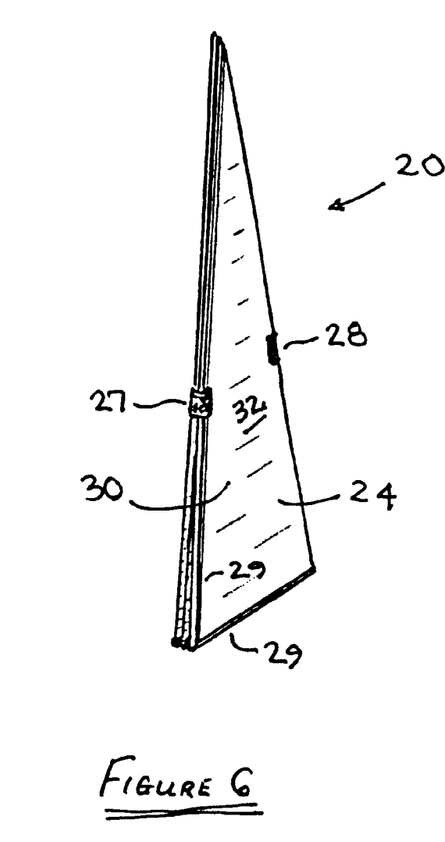

As also shown in FIG. 3, a plurality of assembly tabs 26 and a combination assembly and storage tab 28 affixed to the fifth panel 42 are provided and positioned to mate with a plurality of mating assembly tabs 22 on the exterior face 31 of the first panel 30 when the plant enclosure 20 is set up for use. For storage, as detailed in FIGS. 4 through 6, the assembly tabs 26 and the combination assembly and storage tab 28 are readily peeled from their respective mating assembly tab 22. The various panels 30, 33, 36, 39, 42 may then be folded as shown in the figures along the score lines 54 for compact storage of the plant enclosure 20. In particular, the exterior face 31 of the first panel 30 is folded against the exterior face 34 of the second panel 33, the interior face 35 of the second panel 33 is folded against the interior face 38 of the third panel 36, the exterior face 37 of the third panel 36 is folded against the exterior face 40 of the fourth panel 39, and the interior face 41 of the fourth panel 39 is folded against the interior face 44 of the fifth panel 42. The combination assembly and storage tab 28 and a storage tab 27 each provided along an opposite vertical edge of the exterior face 43 of the fifth panel 42 are then mated with a respective mating storage tab 25 provided and positioned accordingly on the interior face 32 of the first panel 30. In this manner, the plant enclosure 20 is quickly and easily stored in an extremely compact form.

Figure 7:
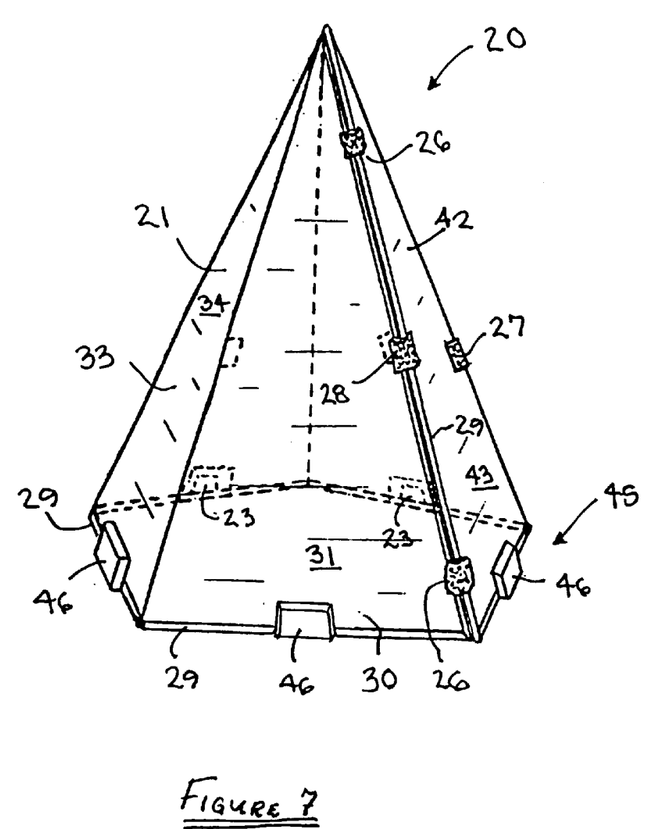
FIGS. 7 through 9 show, in perspective views, details of various wind stabilizers as incorporated into and forming a part of the embodiment of the plant enclosure of FIG. 1.
Figure 8:
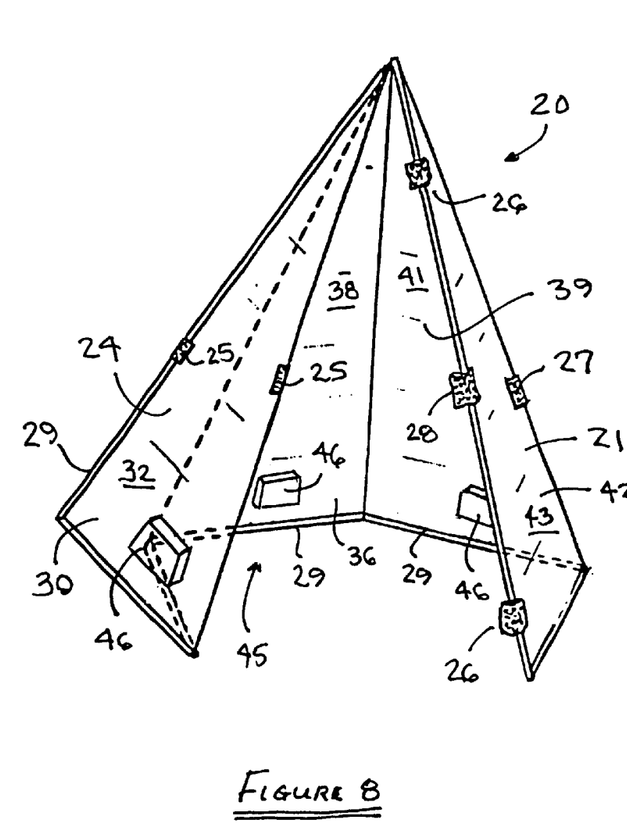
Figure 9:
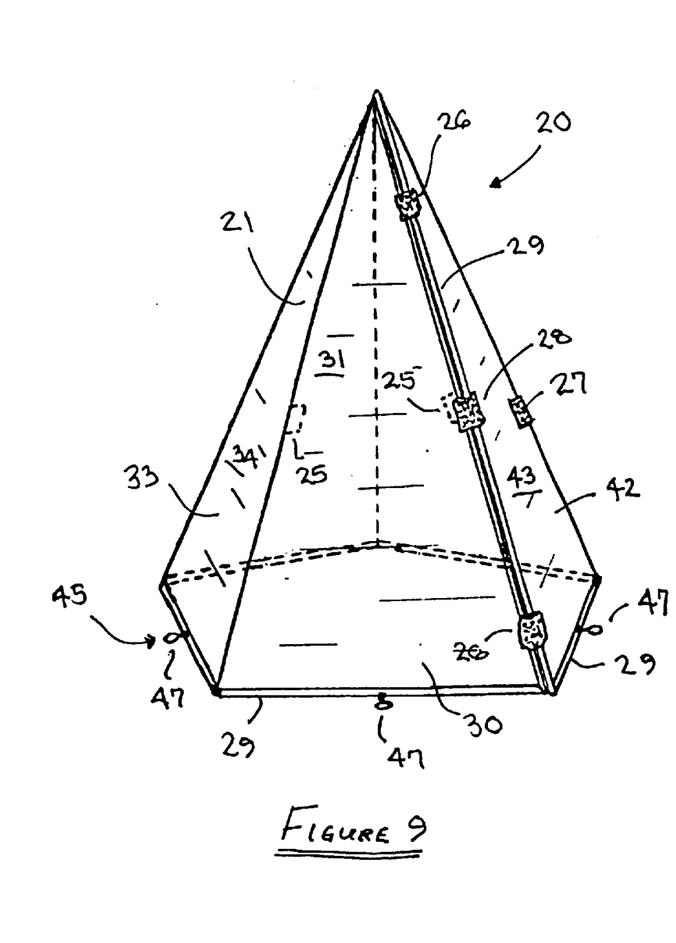

As shown in FIGS. 7 through 9, the plant enclosure 20 also preferably comprises a wind stabilizer 45 or a combination of wind stabilizers 45. As will be appreciated of those of ordinary skill in the art, especially in light of this exemplary description, a suitable wind stabilizer 45 may take any of a variety of forms. For example, as shown in FIGS. 7 and 8, a plurality of anchors 46 may be releasably or permanently affixed at or near the base of either the outer side 21 or the inner side 24 of the plant enclosure 20. For releasable engagement, those of ordinary skill in the art will recognize that each anchor, which may simply comprise a six to eight ounce block for withstanding winds of up to 30 miles per hour, may be provided with a patch of hook or loop type material for engaging a mating anchor tab 23 of loop or hook type material. In the alternative, similar anchors 46 may be more permanently affixed on either the outer side 21 or the inner side 24 of the plant enclosure 20 using a moisture resistant adhesive. In yet another alternative, or in combination with the use of such anchors 46, a plurality of eyelets 47 may be provided as depicted in FIG. 9. Such eyelets 47 may then be utilized in conjunction with stakes or the like for stabilizing the plant enclosure 20 in very extreme wind conditions.

Figure 10:
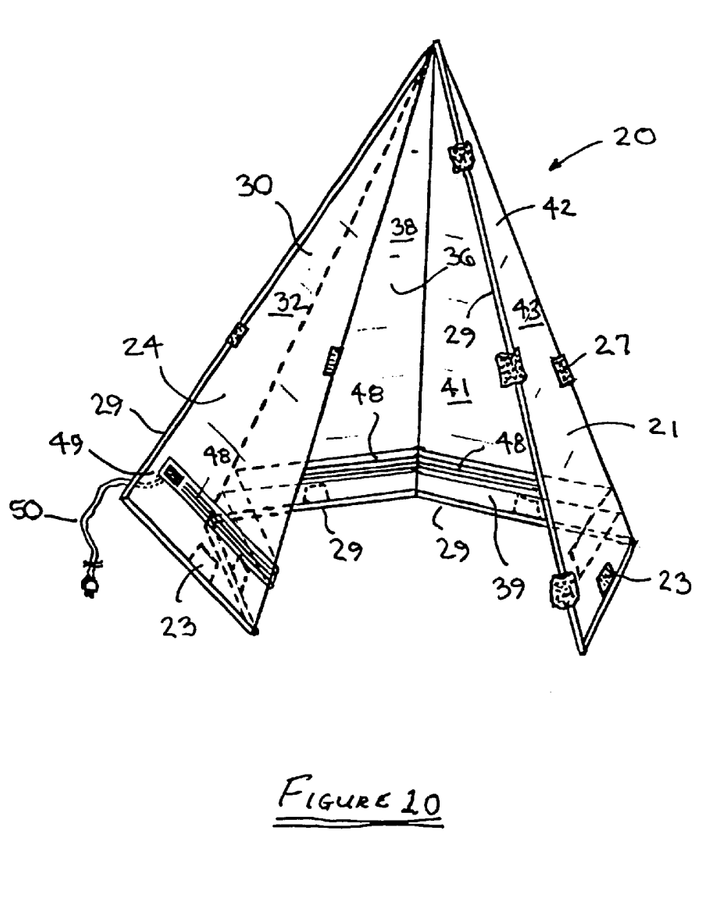
FIG. 10 shows, in a perspective view, details of a heater element as incorporated into and forming a part of the embodiment of the plant enclosure of FIG. 1.

As shown in FIG. 10, the plant enclosure 20 may also be provided with one or more heating strips 48 for use in extremely cold climates. As will be appreciated by those of ordinary skill in the art, such a heating strip 48 typically comprises its own thermostat 49 and is powered with a conventional electric cord 50. Although those of ordinary skill in the art will recognize many alternative fastening means, Applicant has found it convenient to affix the heating strip 48 to the inner side 24 of the plant enclosure 20 utilizing heat-resistant adhesive. As will be appreciated by those of ordinary skill in the art, such adhesives are readily available for withstanding the temperatures expected in the implementation of the preferred embodiment of the present invention, which utilizes a heater strip 48 operable at 110 volts and 60 watts with a thermostat 49 preset to turn on the heater strip 48 at about 35 degrees Fahrenheit and to turn off the heater strip 48 at about 45 degrees Fahrenheit.

Figure 11:
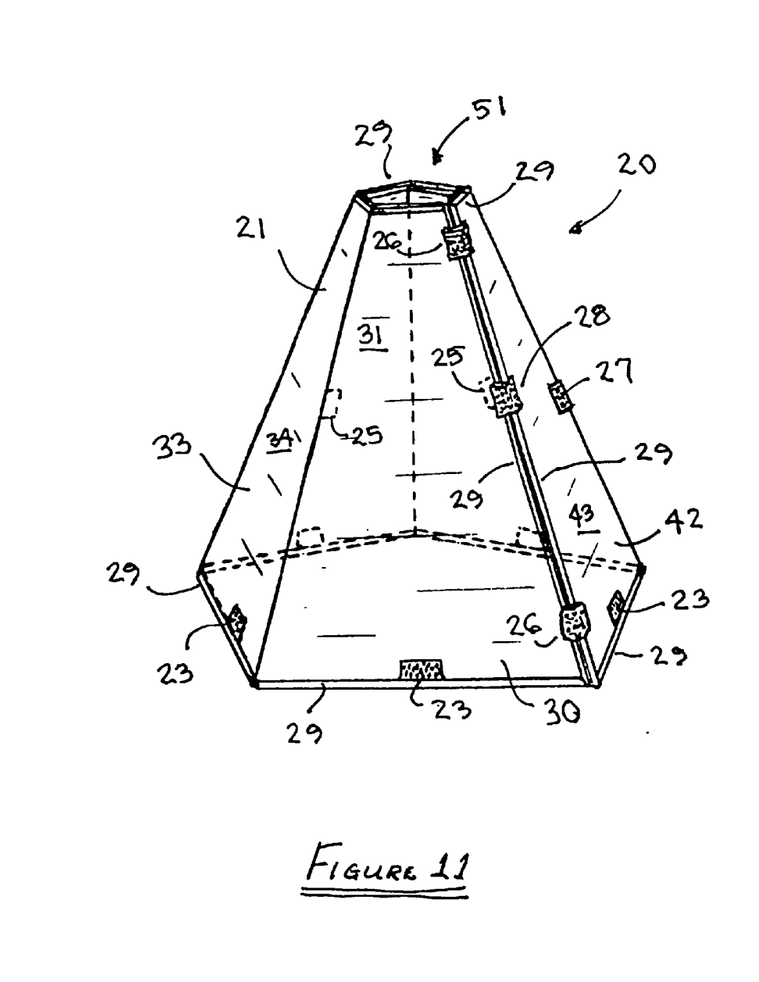
FIGS. 11 and 12 show, in perspective views, alternate embodiments of the plant enclosure of FIG. 1 as are particularly useful for enclosing and protecting plants contained within hanging baskets.
Figure 12:
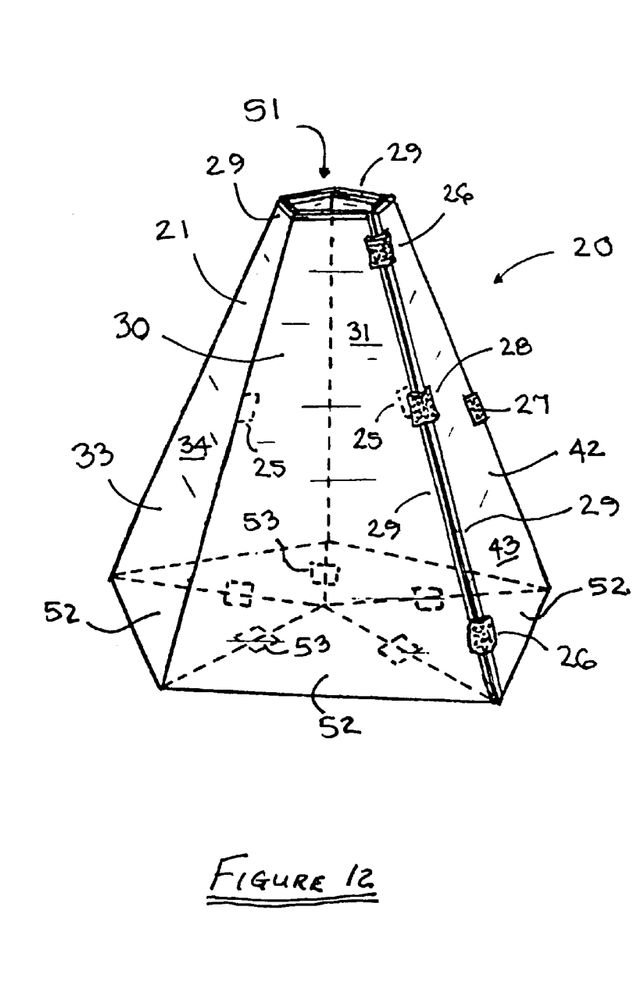

As depicted in FIGS. 11 and 12 additional modifications to the basic structure of the plant enclosure 20 may be made for special purposes such as enclosing a plant contained in a hanging basket. As shown in the figures, a hanging basket opening 51 may be provided at the top of the plant enclosure 20. In this case, it is preferred that additional edge reinforcements 29 be provided to prevent damage to the plant enclosure 20. In such an embodiment, as particularly shown in FIG. 12, a plurality of base panels 52 may be provided for closing the lower portion of the plant enclosure 20. As will be readily appreciated by those of ordinary skill in the art, a plurality of releasably engageable hook and loop type fasteners may be affixed to the various base panels 52 as base closure tabs 53. In this manner, the plant enclosure 20 may be easily wrapped about a hanging plant, and thereafter, the base portion of the plant enclosure 20 may be closed.

Figure 13:
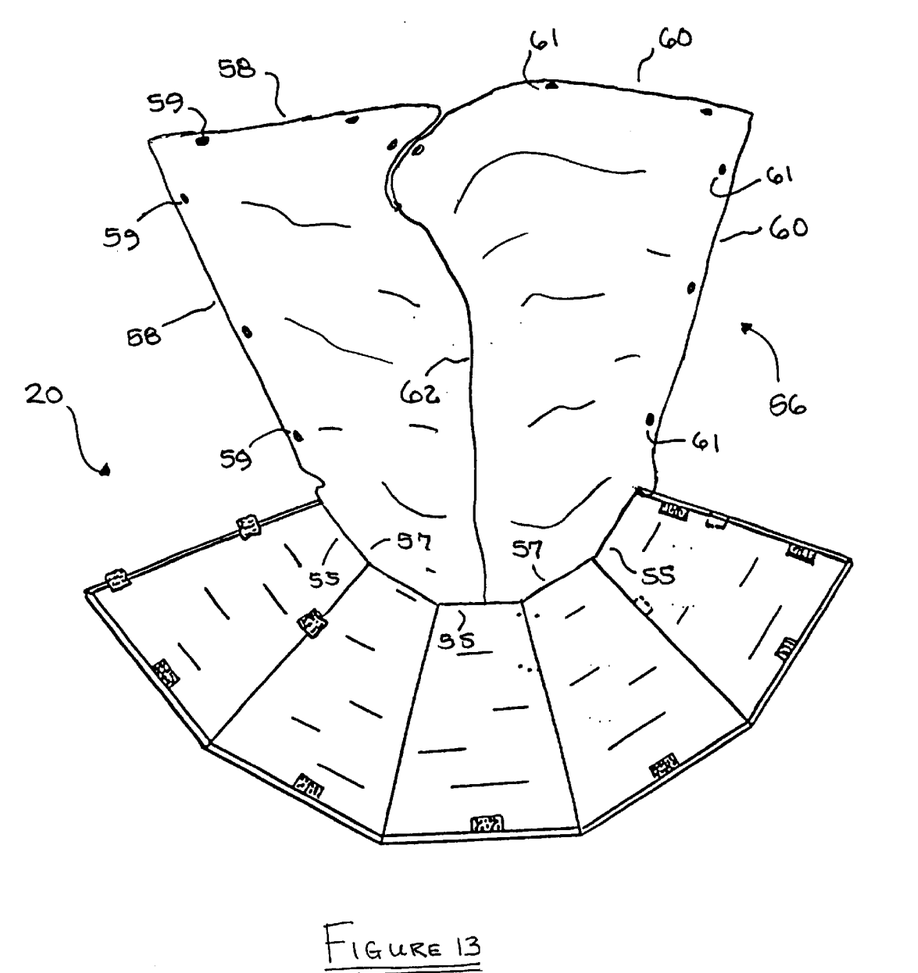
FIG. 13 shows, in an outer side plan view, an embodiment of the previously depicted plant enclosed with a hood with a hood provided for enclosing the upper foliage of certain types of plants.
Figure 14:
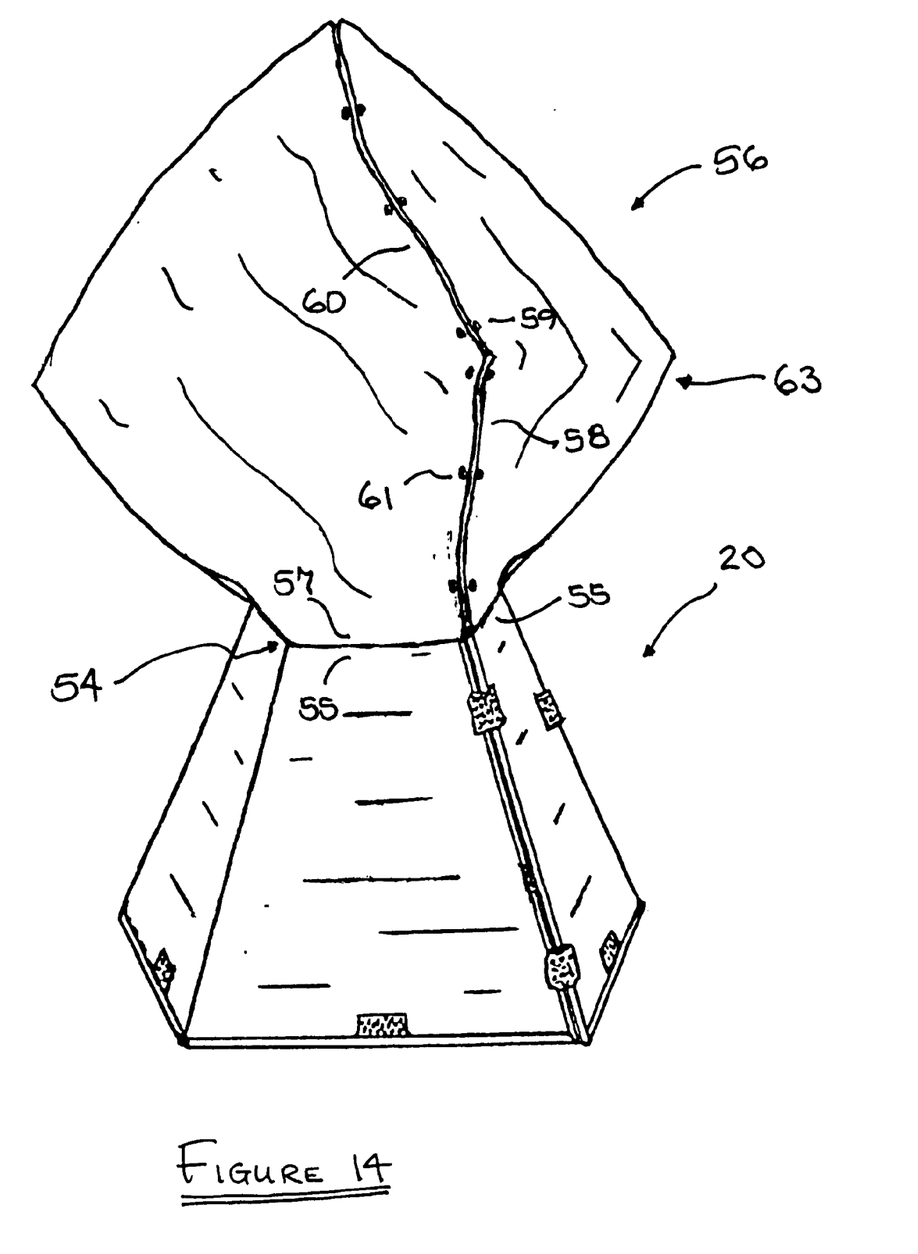
FIG. 14 shows, in a perspective view, the embodiment of FIG. 13 as assembled for use about a plant.

In a modification and extension of the embodiment of the plant enclosure 20 as depicted in FIG. 11, there is depicted in FIGS. 13 and 14 the preferred embodiment of the improvement of the present invention. As shown in FIG. 13, this embodiment of the plant enclosure 20 comprises a trunk orifice 54 similar to, but substantially larger than, the hanging basket opening 51 of the embodiment of the plant enclosure 20 depicted in FIG. 11. Additionally, a hood 56, which may comprise any substantially watertight thermal blanket type material, is provided for enclosing the foliage of plants having relatively voluminous upper portions.

As also shown in FIG. 13, the hood 56 of the present invention is affixed to the panel structure of the plant enclosure 20 by permanently affixing one edge 57 of the hood 56 to the edge 55 of the trunk orifice 54. As will be appreciated by those of ordinary skill in the art, the edges 55, 57 may be affixed in any of a number of ways, including the use of permanent adhesives. Additionally, those of ordinary skill in the art will recognize that the hood 56 may also be releasably affixed to the edge 55 of the trunk orifice 54 utilizing, for example, releasably engageable hook and loop type fasteners. Although releasably affixing the hood 56 in this manner may increase the possibility that an opening may be inadvertently formed between the hood 56 and the panel structure, thereby allowing the ingress of cold air, it is also recognized that releasably affixing the hood 56 does provide the advantage of enabling the hood 56 to be removed from the panel structure of the plant enclosure 20 for machine drying if necessary.

As shown in FIGS. 13 and 14, the first edge 58 of the hood 56 is provided with a first fastener mechanism 59 and the second edge 60 of the hood 56 is provided with a second fastener mechanism 61, the second fastener mechanism 61 being adapted to engage the first fastener mechanism 59. In use, the panel structure of the plant enclosure 20 is assembled about the base or trunk area of a plant to be enclosed as previously described herein. The first edge 58 of the hood 56 and the second edge 60 of the hood 56 are then drawn together about the upper foliage of the enclosed pant by folding the hood 56 about a seam 62. The first edge 58 and the second edge 60 are then secured one to the other with the provided fasteners 59, 61. As will be appreciated by those of ordinary skill in the art, the fasteners may comprise any of a multitude of a appropriate mechanisms such as, for example, snaps, buttons, zippers, releasably engageable hook and loop type material strips, safety pins or any substantial equivalent thereof. As particularly shown in FIG. 14, the fully assembled plant enclosure 20 of this embodiment comprises an upper hooded portion having an enlarged central portion 63 thereby giving the hooded portion of the plant enclosure 20 a substantially spherical shape for quickly and easily enclosing the foliage of even extremely bushy plants including, without limitation, palm trees and the like.

While the foregoing description is exemplary of the preferred embodiment of the present invention, those of ordinary skill in the relevant arts will recognize the many variations, alterations, modifications, substitutions and the like as are readily possible, especially in light of this description, the accompanying drawings and claims drawn thereto. In any case, because the scope of the present invention is much broader than any particular embodiment, the foregoing detailed description should not be construed as a limitation of the scope of the present invention, which is limited only by the claims appended hereto.

What is claimed is:

1. A plant enclosure for protecting outdoor plants from cool weather conditions, said plant enclosure comprising:
   a sheet of thermally insulating material, said sheet being scored to form a plurality of panels;
   a plurality of fasteners attached to said panels, said fasteners being adapted to maintain said sheet in one of a plurality of configurations;
   wherein said panels are shaped such that said sheet may be expanded and formed into an approximately conical shape from a folded shape, said conical shape comprising a top opening and said folded shape being substantially identical to the shape of each said panel;
   a hood affixed to said panels about said top opening; and
   a heating clement affixed to an interior face of said sheet.

2. The plant enclosure as recited in claim 1, wherein said hood comprises a thermal blanket type material.

3. The plant enclosure as recited in claim 2, wherein said hood is removably affixed to said panels.

4. The plant enclosure as recited in claim 1, wherein said hood is permanently affixed to said panels.

5. The plant enclosure as recited in claim 1, wherein said hood comprises a plurality of releasably engageable edges.

6. The plant enclosure as recited in claim 5, wherein said hood is adapted to take a substantially spherical shape upon mating said releasably engageable edges one to another.

7. The plant enclosure as recited in claim 5, wherein each said releasably engageable edge is provided with a fastening mechanism, said fastening mechanisms being adapted to hold pairs of said edges together.

8. The plant enclosure as recited in claim 1, wherein at least a portion of said fasteners serve the dual purpose of maintaining said sheet in both its approximately conical shape and its folded shape.

9. The plant enclosure as recited in claim 1, wherein said sheet comprises a fluted laminate.

10. The plant enclosure as recited in claim 9, wherein said fluted laminate comprises cardboard.

11. The plant enclosure as recited in claim 10, wherein said cardboard is coated with polyurethane.

12. The plant enclosure as recited in claim 9, wherein said fluted laminate comprises a plastic material.

13. The plant enclosure as recited in claim 12, wherein said plastic material comprises polyurethane.

14. The plant enclosure as recited in claim 1, wherein a plurality of said panels are provided with a wind stabilizer.

15. The plant enclosure as recited in claim 14, wherein each said panel is provided with a wind stabilizer.

16. The plant enclosure as recited in claim 14, wherein said wind stabilizers comprise a plurality of eyelets, each said eyelet being affixed to one of said panels.

17. The plant enclosure as recited in claim 1, wherein said heating element is affixed to said interior face with thermally resistant adhesive.

18. A plant enclosure as recited in claim 11, for protecting outdoor plants from cool weather conditions said plant enclosure comprising:
   a sheet of thermally insulating material said sheet being scored to form a plurality of panels;
   a plurality of fasteners attached to said panels, said fasteners being adapted to maintain said sheet in one of a plurality of configurations;
   wherein said panels are shaped such that said sheet may be expanded and formed into an approximately conical shape from a folded shape, said conical shape comprising a to opening and said folded shape being substantially identical to the shape of each said panel;
   a hood affixed to said panels about said top opening; and
   wherein:
      a plurality of said panels are provided with a wind stabilizer; and
      said wind stabilizers comprise a plurality of weighted blocks, each said weighted block being affixed to one of said panels.

19. The plant enclosure as recited in claim 16, wherein each said weighted block is readily releasable from said its panel of affixation.

* * * * *